Nov. 6, 1962     H. J. BRITTON     3,062,555

PACKED JOINT

Filed May 11, 1960

INVENTOR
HARRISON JOHN BRITTON

BY *Raymond W Cotton*

ATTORNEY

United States Patent Office 3,062,555
Patented Nov. 6, 1962

3,062,555
PACKED JOINT
Harrison J. Britton, Cedar Grove, N.J., assignor to Hydromatics, Inc., a corporation of New Jersey
Filed May 11, 1960, Ser. No. 28,311
6 Claims. (Cl. 277—105)

This invention relates to a packed joint primarily intended to effect a seal between relatively movable parts where extreme temperature conditions are encountered.

The maintenance of fluid tight conditions between relatively moving parts at low temperatures has been an extremely difficult problem because of the behavior of compositions ordinarily used for sealing at temperatures substantially below those encountered in nature. In recent years requirements have arisen for the handling of materials at very low temperatures, of the order of $-425°$ F. At such low temperatures, it becomes important to effect a seal between relatively movable parts and at the same time thermally insulate such parts from one another. Metallic packings and packings composed of other conventional materials have completely failed to solve the problems.

It is among the objects of the present invention to provide a packed joint comprising a housing member having a wall defining a passage and a surface defining a seat adjacent the passage, a relatively movable shaft extending into the passage in spaced relationship with the wall, a gland surrounding the shaft, means for securing the gland to the housing member, a Teflon sealing element having a radial flange interposed between the gland and housing member and having an axial skirt engaging the shaft, and a heat insulating resilient element having a radial flange interposed between the gland and housing member and having an axial skirt resiliently engaging the skirt of the sealing element. The resilient element is preferably composed of Mylar and a heat insulating annulus, preferably composed of Teflon or the like is interposed between the gland and the flange of the sealing element. Such a packed joint has been found to be extremely effective where the shaft is relatively rotatable or reciprocable with respect to the housing member, or both rotatable and reciprocable with respect thereto.

A more complete understanding of the invention will follow from a description of the accompanying drawings wherein.

Figure 1:
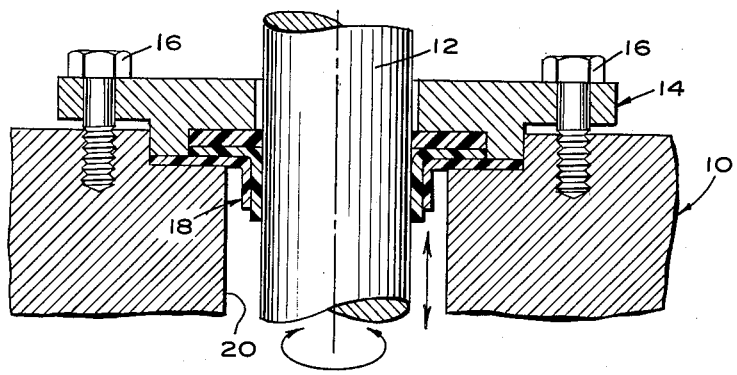
FIG. 1 is a fragmentary sectional elevation depicting the application of the present invention to a shaft which both rotates and reciprocates, for example, a valve stem.

The packed joint is depicted as comprising a housing member 10, which may be considered to be fixed, a shaft 12, which may be considered to be reciprocable and rotatable in both directions as indicated by the arrows, a packing gland 14 secured to the housing member by means of bolts 16 or in any other suitable manner, and a packing assembly 18 clamped between the housing member 10 and the gland 14 for effecting a seal with the shaft 12.

The housing member 10 contains a passage having a wall 20 into which the shaft 12 extends in spaced relationship with respect to the wall. The housing member is counterbored to provide a radial seat 22 to receive the radial flange 24 of a resilient element 26 of a resilient non-metallic material of high strength and which remains flexible and resilient at very low temperatures, such as Mylar, produced by du Pont de Nemours, Wilmington, Delaware, and defined in U.S. Patent No. 2,465,319 as a polyalkyleneterephthalate. This element 26 is cold formed to provide an axial skirt portion 28 which embraces an axial skirt portion 30 of a sealing element 32 having a radial flange 34. This sealing element is characterized by a very low coefficient of friction at extremely low temperatures as compared with other available materials and retains a high degree of cold flow at such temperatures so as to produce a seal. The most satisfactory material known for this sealing element is polytetrafluoroethylene, one form of which is known as Teflon, also produced by du Pont de Nemours, Wilmington, Delaware. This sealing element is also cold formed to the desired configuration.

Figure 2:
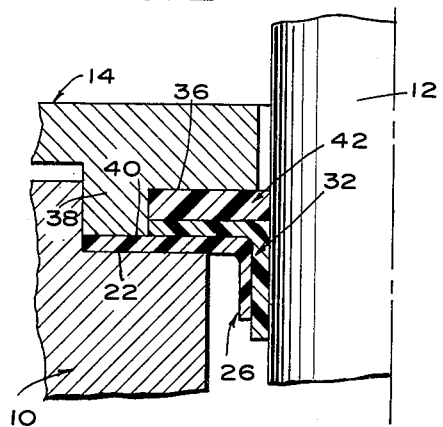
FIG. 2 is a fragmentary sectional elevation on a someenlarged scale based upon FIG. 1.
Figure 3:
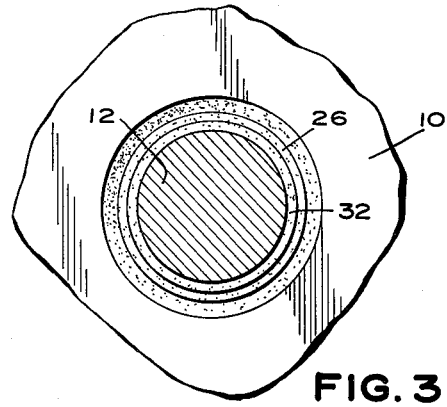
FIG. 3 is a fragmentary bottom plan view based upon the showing of FIG. 1.
Figure 4:
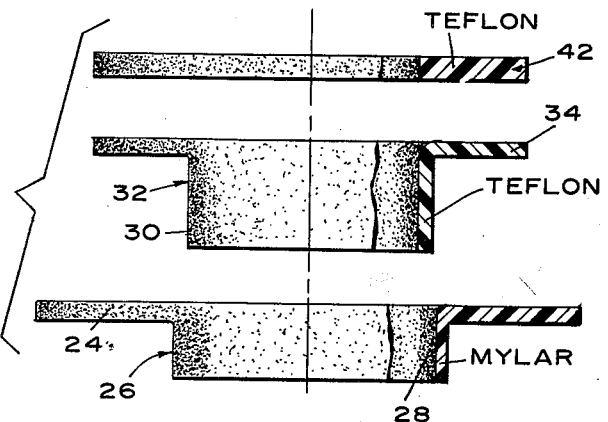
FIG. 4 is an exploded elevation of a packing assembly conforming to the present invention, partially in section.

The gland 14 is counterbored to provide a seat 36 and an annular projection 38 terminaing in a radial bearing surface 40. As best shown in FIG. 2, a portion of the radial flange 24 of the resilient element 26 is engaged between the bearing surface 40 of the gland and the seat 22 of the housing member while another portion of the radial flange 24 of the resilient element 26, a portion of the radial flange 34 of the sealing element 32 and a portion of an annulus 42 are clamped between the seat 36 of the gland 14 and the seat 22 of the housing member 10. The annulus 42 is also preferably composed of polytetrafluoroethylene, or Teflon, because of its heat insulating property, its low coefficient of friction at low temperatures, and its ability to reinforce or back up the other elements of the packing assembly.

By virtue of the resilient properties of the element 26 even at extremely low temperatures, its axial skirt portion tends to contract the shirt portion 30 of the sealing element tightly about the shaft 12 and because of the extremely low coefficient of friction of the sealing element 32 even at the low temperatures contemplated, and its cold flow characteristics at such temperatures, an extremely effective seal is produced. The annulus 42, having the same properties as the sealing element 32, produces an added sealing effect for the same reasons.

Whereas the packed joint of the present invention is eminently suited for sealing a valve stem with respect to a housing, it is equally applicable for the sealing of moving parts in other environments, and particularly at low temperature conditions.

Whereas only one specific form of the invention has been portrayed, such modifications as will occur to those skilled in the art are contemplated within the scope of the appended claims.

I claim:
1. A packed joint comprising a housing member having a wall defining a passage and a surface defining a seat adjacent said passage, a relatively movable shaft extending into said passage in spaced relationship with said wall, a gland surrounding said shaft, means for securing said gland to said housing member, a polytetrafluoroethylene sealing element having a radial flange interposed between said gland and housing member and having an axial skirt engaging said shaft, and a heat insulating resilient element having a radial flange interposed between said gland and housing member and having an axial skirt resiliently biasing the skirt of said sealing element about said shaft, said heat insulating resilient element being composed of a polyalkyleneterephthalate having at very low temperatures a high resiliency as compared with said sealing element.

2. A packed joint as set forth in claim 1 wherein a heat insulating annulus is interposed between said gland and the flange of said sealing element.

3. A packed joint as set forth in claim 2 wherein said annulus is composed of polytetrafluoroethylene.

4. A packed joint as set forth in claim 1 wherein said shaft is rotatable relative to said housing member.

5. A packed joint as set forth in claim 1 wherein said shaft is reciprocable relative to said housing member.

6. A packed joint as set forth in claim 1 wherein said shaft is rotatable and reciprocable relative to said housing member.

References Cited in the file of this patent

UNITED STATES PATENTS

| | | |
|---|---|---|
| 2,465,219 | Whinfield et al. | Mar. 22, 1949 |
| 2,600,293 | Heldal | June 10, 1952 |
| 2,765,023 | Fagg et al. | Oct. 2, 1956 |
| 2,825,590 | Sutherland | Mar. 4, 1958 |
| 2,831,714 | Thorburn | Apr. 22, 1958 |
| 3,004,783 | Webb | Oct. 17, 1961 |

FOREIGN PATENTS

| | | |
|---|---|---|
| 273,922 | Great Britain | July 14, 1927 |

UNITED STATES PATENT OFFICE
CERTIFICATE OF CORRECTION

Patent No. 3,062,555　　　　　　　　　　　　　　　November 6, 1962

Harrison J. Britton

It is hereby certified that error appears in the above numbered patent requiring correction and that the said Letters Patent should read as corrected below.

Column 1, line 30, for "seal ng" read -- sealing --; line 35, for "ax al" read -- axial --; column 2, line 35, for "shirt" read -- skirt --; line 36, for "t ghtly" read -- tightly --; line 44, for "seal ng" read -- sealing --; line 57, for "surround ng" read -- surrounding --; line 62, for "sa d" read -- said --; line 66, for "be ng" read -- being --; column 3, line 6, for "hous ng" read -- housing --; column 4, line 3, for "2,465,219" read -- 2,465,319 --.

Signed and sealed this 21st day of May 1963.

(SEAL)
Attest:

ERNEST W. SWIDER
Attesting Officer

DAVID L. LADD
Commissioner of Patents